(No Model.) 3 Sheets—Sheet 1.
C. COCHRANE.
APPARATUS FOR DRYING AIR FOR FURNACES AND OTHER PURPOSES.
No. 333,395. Patented Dec. 29, 1885.
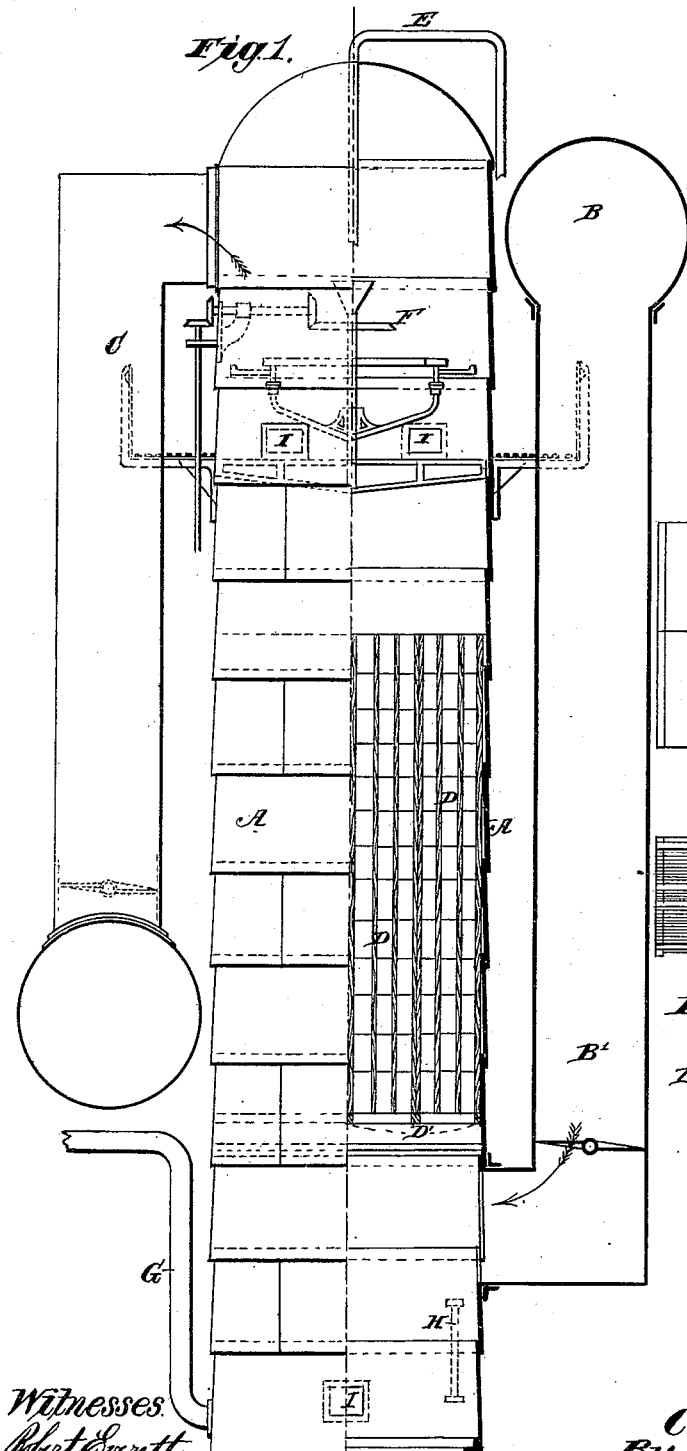
Witnesses
Robert Burtt,
J. A. Rutherford
Inventor
Charles Cochrane,
By James L. Norris
Atty.

(No Model.) 3 Sheets—Sheet 2.
C. COCHRANE.
APPARATUS FOR DRYING AIR FOR FURNACES AND OTHER PURPOSES.
No. 333,395. Patented Dec. 29, 1885.
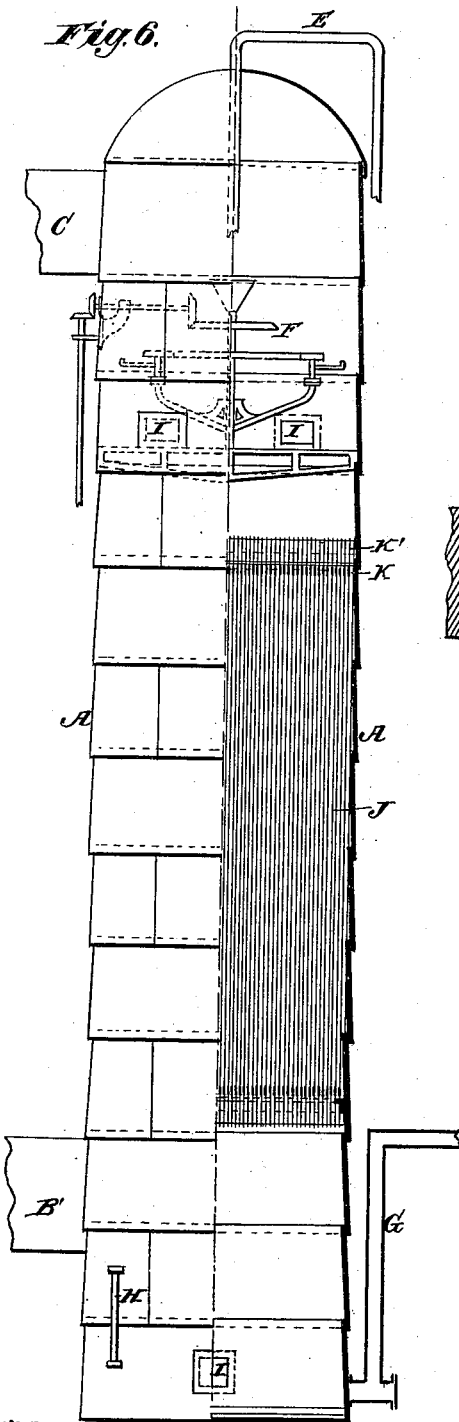
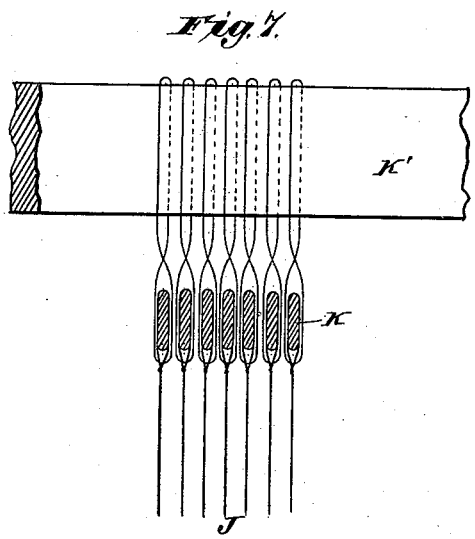

(No Model.) 3 Sheets—Sheet 3.
C. COCHRANE.
APPARATUS FOR DRYING AIR FOR FURNACES AND OTHER PURPOSES.
No. 333,395. Patented Dec. 29, 1885.
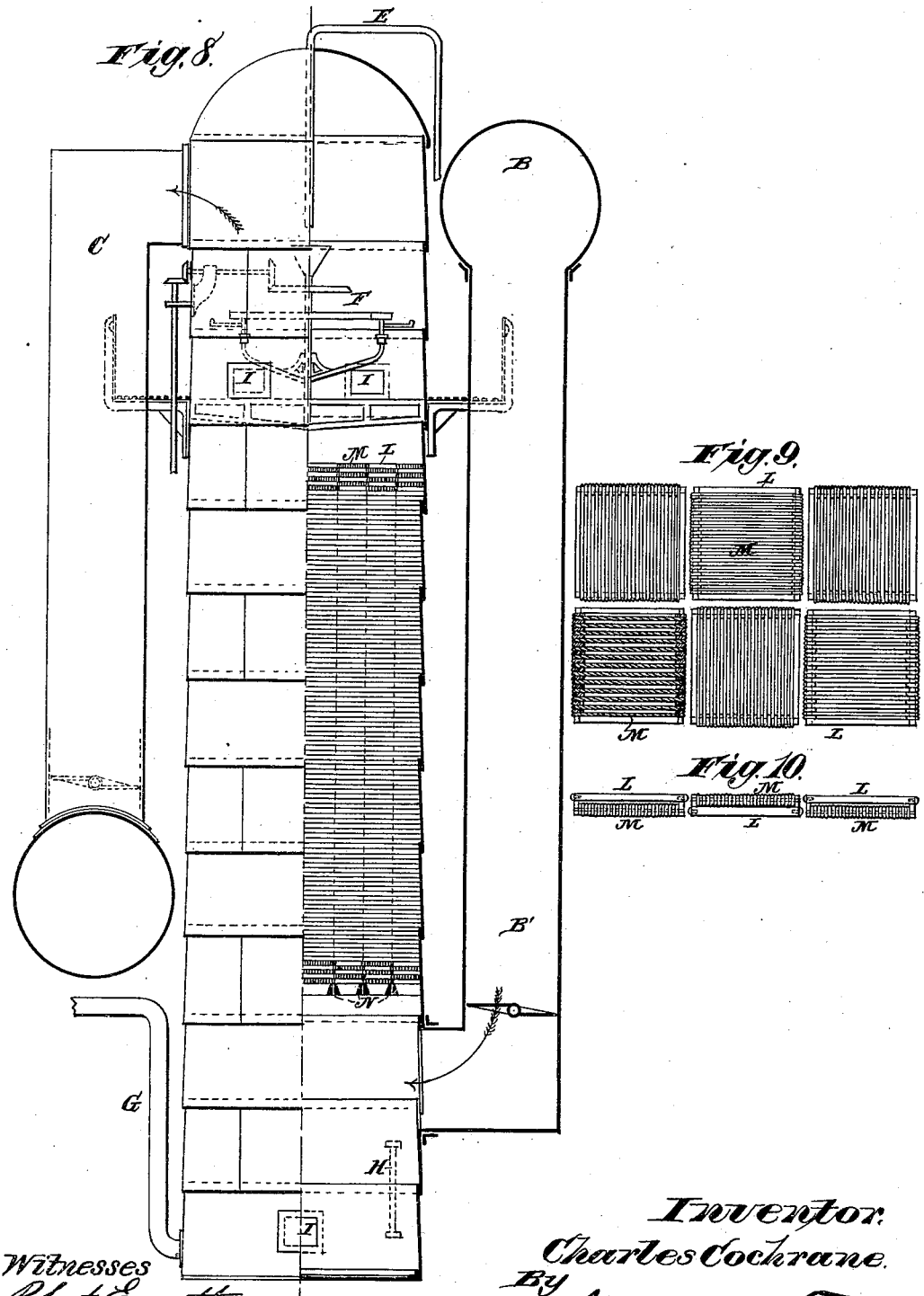
Witnesses
Robert Everett
J. A. Rutherford
Inventor
Charles Cochrane
By James L. Norris
Atty.

UNITED STATES PATENT OFFICE.

CHARLES COCHRANE, OF STOURBRIDGE, COUNTY OF WORCESTER, ENGLAND.

APPARATUS FOR DRYING AIR FOR FURNACES AND OTHER PURPOSES.

SPECIFICATION forming part of Letters Patent No. 333,395, dated December 29, 1885.

Application filed August 12, 1885. Serial No. 174,229. (No model.)

*To all whom it may concern:*

Be it known that I, CHARLES COCHRANE, a citizen of England, residing at Stourbridge, in the county of Worcester, England, have invented a new and useful Apparatus for Drying Air for Furnaces and for other Purposes, of which the following is a specification.

My present invention relates to apparatus whereby the air-supply is brought into the necessary intimate contact with a concentrated solution of calcium chloride, such apparatus being also applicable for drying air for other purposes, and consisting, mainly, in arrangements whereby calcium chloride in a state of solution introduced at the upper end of a closed chamber or tower is caused to pass downward over very extended surfaces having interstices or spaces through which the air required to be dried is caused to pass in an upward direction, so as to come into intimate contact with the calcium chloride upon the said extended surfaces.

I do not wish to be understood as herein claiming the method of depriving the air-supply to furnaces of moisture by causing the same to pass on its way to the heating stove, furnace, or blower in contact with solutions of calcium chloride, as such constitutes the subject-matter of my application for Letters Patent Serial No. 166,630.

The apparatus which constitutes the subject-matter of my present application is illustrated by the accompanying drawings, in which—

Figure 1 is a sectional elevation of the apparatus; Fig. 2, an enlarged elevation of one of the frames carrying the stretched fabric; Fig. 3, a cross-sectional view of the same; Fig. 4, a plan view of the same; Fig. 5, a further enlarged detail sectional view; Fig. 6, a sectional elevation of a modified construction of apparatus; Fig. 7, a detail view showing the manner of supporting the canvas surfaces illustrated in Fig. 6; Fig. 8, a sectional elevation of another modification of the apparatus, and Figs. 9 and 10 plan and side views of the surfaces shown in Fig. 8 over which the calcium-chloride solution flows.

A is a vertical air-tight casing of circular cross-section, into the lower part of which the air to be desiccated is introduced through the branch pipe B' from the main pipe B, while the dried air issues therefrom at the top through the pipe C. Within the casing A are arranged a number of frames, D D, containing stretched sheets of canvas or other suitable fabric, d d, arranged in vertical positions closely side by side between wood laths d', as shown more clearly in the enlarged elevation, cross-section, and plan thereof at Figs. 2, 3, and 4, and in the still farther enlarged detail at Fig. 5. These frames, being supported at bottom by beams D', and arranged side by side and one above the other, as shown, offer very extended surfaces, over which the concentrated calcium-chloride solution is made to flow downward, this being supplied through a pipe, E, to any suitable arrangement of distributing apparatus, F, by which the liquid is distributed uniformly over all the frames at top. Thus the air in passing up from the pipe B' through the narrow spaces between the canvas sheets is brought into very intimate contact with the calcium-chloride solution flowing down them, and it will be seen that the air entering from B' containing the full amount of moisture will be brought in contact with the chloride of calcium flowing down the lowermost frames, which has already taken up a large amount of moisture, while in passing upward the air will become more and more deprived of its moisture, until near the top it is brought in contact with the fresh calcium chloride, so that by this well-known action of reversed currents the air will be very effectually deprived of its moisture with a minimum expenditure of calcium chloride. The calcium-chloride solution in a more or less dilute condition consequent upon the moisture which it has taken up, collects in the bottom of the casing A, and is discharged thence by blast-pressure on the surface of the liquid through the pipe G, or it may be withdrawn by a pump in order to be evaporated down to the requisite concentrated condition for being used over again in the apparatus. H is a glass gage for observing the height of the solution in the casing. I I are man-holes for gaining access to the interior thereof.

In the modified arrangement shown at Fig. 6 the canvas surfaces J J, instead of being stretched in small frames piled one above the other, as in the above-described arrangement, are formed as continuous sheets extending from top to bottom, being attached to stiffening-laths K, which are secured by ropes to beams K'. fixed on the casing A, as shown more clearly at the enlarged detail, Fig. 7.

The apparatus is otherwise of the same construction as above described.

Fig. 8 shows another mode of forming extended surfaces for the calcium-chloride solution to flow over. In this case wooden rectangular frames L L, wound round with rope M, are supported at bottom by beams N, and are arranged closely side by side and one above the other, being made to alternate in position, as shown more clearly in the enlarged plan and side view at Figs. 9 and 10. The alternation of the position of the frames may be variously modified, and it might indeed almost be dispensed with. The rope is so wound upon the frames as to leave a small space between each successive winding, thus forming narrow passages for the air-blast to pass up through, while the calcium-chloride solution, supplied from the distributing apparatus F, drips down from the ropes of one frame to those of the next below.

It will be evident that the above-described construction of apparatus may also be applied for drying air-supply for other purposes besides furnaces.

In practicing my invention with either form of apparatus above described any solution of calcium chloride may be used, provided the said chloride is not already completely saturated with water; but the more concentrated the solution the better. It should only have sufficient water to make it flow as a liquid.

Heretofore calcium chloride in a solid form has been employed for the purpose of desiccating the air-supply of blast-furnaces; but it is obvious that while it remains in a solid form it cannot be readily brought into such intimate contact with the air-supply of a furnace as is possible with a concentrated calcium-chloride solution flowing over the extended surfaces of a series of fibrous or tissue like diaphragms arranged in the course of the air-supply.

Towers for desiccating air by means of solid calcium chloride have been provided with a series of horizontal gratings or perforated diaphragms for supporting the solid chloride, the openings in said gratings or perforated diaphragms being graduated or made larger in the upper diaphragm and smaller in the lower ones, so as to facilitate the separation of the smaller from the larger lumps of calcium chloride as the lumps become gradually reduced in size. By this construction the dissolved chloride drips from the upper to the lower gratings, and the fragments of chloride gradually diminish in size as they descend through the tower.

My invention differs from that above referred to in that the tissues or diaphragms are placed side by side and close together to afford continuous surfaces for the calcium-chloride solution to flow over, and the calcium chloride, instead of being placed in the tower or casing in a solid form, is introduced in a state of solution, thereby facilitating its handling and enabling it to saturate the surface over which it flows, and thus come into more intimate contact with the air to be desiccated. A solution consisting of, say, sixty parts of calcium chloride to seventy parts of water, by weight, and distributed over a porous surface exposed to moist air, is capable of absorbing at least one hundred and fifty parts of water.

While preferring a concentrated solution of calcium chloride sufficiently dilute to flow over the fibrous diaphragms or tissues, I do not limit myself to a solution of any specific strength.

Having thus described my invention, what I claim is—

1. In an apparatus for drying air, the combination, with a casing having an air-inlet at one end and an air-eduction pipe at the other, of a series of frames covered with canvas or textile material, or wound with rope and placed in said casing between its ends, whereby an extended surface is afforded over which the air is caused to pass, a pipe for supplying the casing with a solution of calcium chloride, and a device for distributing said solution, substantially as described.

2. In an apparatus for drying air, the combination of a closed casing or chamber, A, the inlet B', for the air to be dried, the outlet C, for the dried air, the inlet E, for calcium-chloride solution, the discharge-pipe G, for said solution, and a series of frames carrying sheets of canvas or wound with rope, arranged vertically in said casing for exposing the flowing calcium-chloride solution to contact with the air passed through said casing, substantially as described.

In testimony whereof I have signed my name to this specification, in the presence of two subscribing witnesses, this 22d day of June, A. D. 1885.

CHARLES COCHRANE.

Witnesses:
BROUGH SIMPSON,
A. G. WHITEHOUSE.